United States Patent
Hikichi (10) Patent No.: US 9,075,705 B2
(45) Date of Patent: Jul. 7, 2015

(54) INFORMATION PROCESSING APPARATUS CAPABLE OF APPROPRIATELY PROVIDING NOTIFICATION OF STORAGE UNIT FAILURE PREDICTION, CONTROL METHOD THEREFOR, AND STORAGE MEDIUM

(71) Applicant: CANON KABUSHIKI KAISHA, Tokyo (JP)

(72) Inventor: Atsushi Hikichi, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 223 days.

(21) Appl. No.: 13/906,439

(22) Filed: May 31, 2013

(65) Prior Publication Data

US 2013/0332780 A1    Dec. 12, 2013

(30) Foreign Application Priority Data

Jun. 8, 2012   (JP) .................. 2012-130665

(51) Int. Cl.
*G06F 11/00* (2006.01)
*G06F 11/30* (2006.01)
*G06F 11/07* (2006.01)
*G06F 11/20* (2006.01)

(52) U.S. Cl.
CPC .......... *G06F 11/004* (2013.01); *G06F 11/3013* (2013.01); *G06F 11/0766* (2013.01); *G06F 11/2087* (2013.01); *G06F 11/008* (2013.01); *G06F 11/0727* (2013.01)

(58) Field of Classification Search
CPC ............ G06F 11/3013; G06F 11/3034; G06F 11/3065; H04N 1/00002
See application file for complete search history.

(56) References Cited

U.S. PATENT DOCUMENTS

| | | | |
|---|---|---|---|
| 7,216,244 B2 * | 5/2007 | Amano ................... | 713/324 |
| 7,409,594 B2 * | 8/2008 | Mukherjee et al. ............ | 714/26 |
| 7,434,097 B2 * | 10/2008 | Guha et al. ................. | 714/6.32 |
| 2013/0054892 A1* | 2/2013 | Kannari ...................... | 711/114 |

FOREIGN PATENT DOCUMENTS

| JP | 2001-312375 A | 11/2001 |
|---|---|---|
| JP | 2006-256251 A | 9/2006 |

* cited by examiner

*Primary Examiner* — Joseph Kudirka
(74) *Attorney, Agent, or Firm* — Rossi, Kimms & McDowell LLP (57) ABSTRACT

An information processing apparatus which is capable of reducing operational costs required for the information processing apparatus equipped with HDDs having a mirroring function and a self-diagnosis function. Status information indicative of statuses of the HDDs is obtained by the self-diagnosis function which the HDDs have. Based on the obtained status information obtained, whether or not the HDDs will fail is predicted. When a failure of the HDDs is predicted, and the mirroring function is disabled, an electronic device determined in advance is notified that replacement of the HDDs is necessary. When a failure of the HDDs is predicted, and the mirroring function is enabled, the electronic device is not notified that replacement of the HDDs is necessary.

6 Claims, 10 Drawing Sheets

| HDD(1) STATUS | HDD(2) STATUS | MIRRORING FUNCTION | NOTIFICATION METHOD |
|---|---|---|---|
| NORMAL | NORMAL | ENABLED | NOTIFICATION UNNECESSARY |
| SMART ABNORMAL | NORMAL | ENABLED | ALARM |
| SMART ABNORMAL | SMART ABNORMAL | ENABLED | ALARM |
| FAIL | NORMAL | ENABLED | ERROR |
| FAIL | SMART ABNORMAL | ENABLED | ERROR |
| FAIL | FAIL | ENABLED | ACTIVATION IMPOSSIBLE |
| NORMAL | – | DISABLED | NOTIFICATION UNNECESSARY |
| SMART ABNORMAL | – | DISABLED | ERROR |
| FAIL | – | DISABLED | ACTIVATION IMPOSSIBLE |

INFORMATION PROCESSING APPARATUS CAPABLE OF APPROPRIATELY PROVIDING NOTIFICATION OF STORAGE UNIT FAILURE PREDICTION, CONTROL METHOD THEREFOR, AND STORAGE MEDIUM

BACKGROUND OF THE INVENTION

1. Field of the Invention

The present invention relates to an information processing apparatus, a control method therefor, and a computer-readable storage medium storing a program for implementing the control method.

2. Description of the Related Art

In recent years, as image forming apparatuses have become increasingly sophisticated, it has become common to store user data in a nonvolatile device such as an HDD (hard disk drive) or flash memory and read and use the user data when using a certain function.

In this case, when a nonvolatile device in which user data is stored fails, it becomes impossible to read the user data.

As a countermeasure against data loss caused by such a nonvolatile device failure, there is a mirroring function (RAID1) of constantly backing up data using two HDDs and providing notification when the HDDs fail.

There is also a failure predicting function of, before an HDD fails, using S.M.A.R.T. (Self-Monitoring, Analysis and Reporting Technology) information on the HDD to provide notification of a failure prediction indicating that a failure of the HDD is anticipated, thus urging a user to back up data.

In a case where, out of the mirroring function and the failure predicting function described above, only the mirroring function is enabled, data is constantly backed up, and hence a service engineer has only to replace the HDD after the HDD fails.

Using an HDD to the limit as described above has a merit of, for a user, eliminating downtime of an image forming apparatus caused by occurrence of an error, and a merit of, for the service engineer, reducing maintenance costs.

On the other hand, in a case where only the failure predicting function is enabled, upon receiving notification of a failure prediction, a service engineer needs to replace an HDD after backing up user data so as to ensure the user data. This failure prediction, however, is merely a prediction, and hence the HDD may fail immediately after notification or may be usable for several years after notification.

In a case where both the mirroring function and the failure predicting function are enabled, when notification of a failure prediction using the failure predicting function is provided, notification of an error is provided to a user although an HDD can still be used.

As a result, it is necessary to replace the HDD of an image forming apparatus for which notification of the error has been provided, resulting in undesired downtime and cost of maintenance by a service engineer.

Moreover, when both the mirroring function and the failure predicting function are enabled, this means that an image forming apparatus is equipped with two HDDs. In this case, when notification of a failure prediction with respect to both the two HDDs is provided, it is necessary to notify a user of the failure prediction although the two HDDs are unlikely to fail at the same time. The user, however, does not know what to do even when he/she is notified of the failure prediction.

In relation to the above described technique, there has been disclosed a technique that S.M.A.R.T. information is stored in a server in case that the S.M.A.R.T. information is corrupted, and in the server, the S.M.A.R.T. information is compared with a previous log to thus reduce the load for analyzing the cause of a failure (see, for example, Japanese Laid Open Patent Publication (Kokai) No. 2001-312375).

Also, there has been disclosed a technique that a failure is predicted based on, for example, the number of accesses to an HDD or the like (see, for example, Japanese Laid Open Patent Publication (Kokai) No. 2006-256251).

For example, according to the technique described in Japanese Laid Open Patent Publication (Kokai) No. 2001-312375, a server can be notified of a status of an image forming apparatus, and also, values obtained using the failure predicting function can be backed up to the server.

According to the technique described in Japanese Laid Open Patent Publication (Kokai) No. 2006-256251, a failure can be predicted based on the number of accesses. These conventional arts can improve the accuracy of the failure predicting function.

However, when both the mirroring function and the failure predicting function are enabled, problems described hereafter arise. First, unnecessary notification of a failure prediction is provided to a user. This means that, for example, an image forming apparatus provides notification of a failure prediction to a user interface or the like.

Next, unnecessary notification of a failure prediction is provided to a service engineer. This means that, for example, unnecessary notification of an error is provided to a server that manages an image forming apparatus, and a service engineer is called.

Moreover, notification of a failure prediction is provided which causes a service engineer to falsely recognize that a trouble is serious and urgent. This means that, for example, notification of an error is provided to a server that manages an image forming apparatus, and the service engineer is called although a visit of the service engineer is unnecessary.

Further, even if a display indicative of a failure prediction notification is produced on a user interface of an image forming apparatus or the like, a user does not know what to do.

As described above, the conventional techniques have the problem of requiring unnecessary operational costs for calling a service engineer, replacing an HDD, and so on.

SUMMARY OF THE INVENTION

The present invention provides an information processing apparatus and a control method therefor which are capable of reducing operational costs required for the information processing apparatus equipped with storage units having a mirroring function and a self-diagnosis function, as well as a computer-readable storage medium storing a program for implementing the control method.

Accordingly, a first aspect of the present invention provides an information processing apparatus comprising storage units configured to have a mirroring function and a self-diagnosis function, a notification unit configured to notify an electronic device, which is determined in advance, of information on the storage units, an obtainment unit configured to obtain status information indicative of statuses of the storage units obtained by the self-diagnosis function which the storage units have, a prediction unit configured to, based on the status information obtained by the obtainment unit, predict whether the storage units will fail, and a control unit configured to control the notification unit such that, when the prediction unit predicts a failure of the storage units, and the mirroring function is disabled, the electronic device is notified that replacement of the storage units is necessary, and control the notification unit such that, when the prediction unit predicts a failure of the storage units, and the mirroring function is enabled, the electronic device is not notified that replacement of the storage units is necessary.

Accordingly, a second aspect of the present invention provides a control method for an information processing apparatus having storage units that has a mirroring function and a self-diagnosis function, and a notification unit that notifies an electronic device, which is determined in advance, of information on the storage units, comprising an obtainment step of obtaining status information indicative of statuses of the storage units obtained by the self-diagnosis function which the storage units have, a prediction step of, based on the status information obtained in the obtainment step, predicting whether the storage units will fail, and a control step of controlling the notification unit such that, when a failure of the storage units is predicted in the prediction step, and the mirroring function is disabled, the electronic device is notified that replacement of the storage units is necessary, and controlling the notification unit such that, when a failure of the storage units is predicted in the prediction step, and the mirroring function is enabled, the electronic device is not notified that replacement of the storage units is necessary.

Accordingly, a third aspect of the present invention provides a non-transitory computer-readable storage medium storing a program for causing a computer to implement a control method for an information processing apparatus having storage units that has a mirroring function and a self-diagnosis function, and a notification unit that notifies an electronic device, which is determined in advance, of information on the storage units, the control method comprising an obtainment step of obtaining status information indicative of statuses of the storage units obtained by the self-diagnosis function which the storage units have, a prediction step of, based on the status information obtained in the obtainment step, predicting whether the storage units will fail, and a control step of controlling the notification unit such that, when a failure of the storage units is predicted in the prediction step, and the mirroring function is disabled, the electronic device is notified that replacement of the storage units is necessary, and controlling the notification unit such that, when a failure of the storage units is predicted in the prediction step, and the mirroring function is enabled, the electronic device is not notified that replacement of the storage units is necessary.

According to the present invention, because notification of a failure prediction with respect to the storage units can be provided in an appropriate manner, undesired downtime and operational costs required for replacement of the storage units can be reduced.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof. It should be noted that in the following description of the present embodiment, an information processing apparatus according to the present invention is applied to an image forming apparatus.

Figure 1:
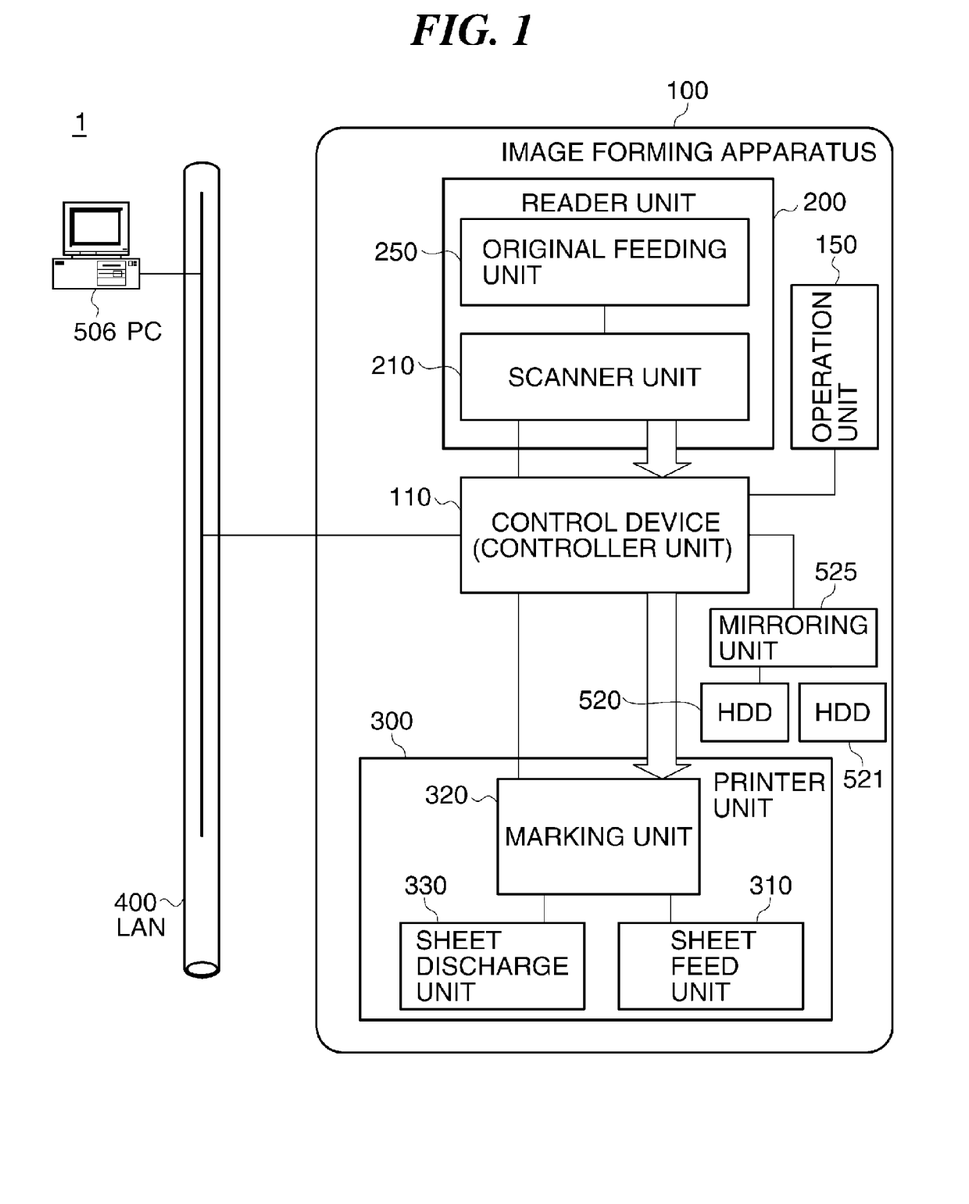
FIG. 1 is a diagram schematically showing an arrangement of a remote monitoring system including an image forming apparatus according to an embodiment of the present invention.

FIG. 1 is a diagram schematically showing an arrangement of a remote monitoring system 1 including an image forming apparatus 100 according to the embodiment of the present invention.

Referring to FIG. 1, a reader unit 200 of the image forming apparatus 100 optically reads an image off an original and converts the image into image data. The reader unit 200 is comprised of a scanner unit 210 having a function for reading an original, and an original feeding unit 250 (hereafter referred to as "the feeder") having a function for conveying a sheet which is an original.

A printer unit 300 conveys a recording sheet, prints image data as a visible image on the recording sheet, and discharges the recording sheet from the image forming apparatus 100. The printer unit 300 is comprised of a sheet feed unit 310 having multiple types of recording sheet cassettes, a marking unit 320 having a function of transferring and fixing image data to a recording sheet, and a sheet discharge unit 330 having a function of sorting and stapling printed recording sheets and outputting them from the apparatus.

A control device 110 controls the entire image forming apparatus 100. The control device 110 is electrically connected to HDDs (hard disk drives) 520 and 521 by way of the reader unit 200, the printer unit 300, and a mirroring unit 525. The HDDs (hard disk drives) 520 and 521 correspond to storage units.

The control device 110 provides a copy function of controlling the reader unit 200 to read image data from an original and controlling the printer unit 300 to print image data on a recording sheet. Also, the control device 110 provides a scanner function of converting image data, which is read from the reader unit 200, into code data and sending the code data to a PC 506.

Further, the control device 110 provides a printer function of converting code data, which is received from the PC 506 via a LAN 400, into image data and outputting the same to the printer unit 300, and a box function of storing sent and received image data in the HDDs 520 and 521.

The mirroring unit 525 backs up information, which is stored in the HDD 520, to the HDD 521, and stores appropriate information in each of the HDDs 520 and 521. Thus, the HDDs 520 and 521 have a mirroring function.

An operation unit 150 is a user interface that displays information for a user by an LCD touch panel and is for the user to operate the image forming apparatus 100.

Also, the image forming apparatus 100 appearing in FIG. 1 is connected to the PC 506, which is a monitoring device for use in monitoring the image forming apparatus 100, via the LAN 400 as shown in the figure. The PC 506 is equipped with software for forming the remote monitoring system 1.

This remote monitoring system uses a network to automatically detect monitoring information such as notifications about troubles and service errors, sheet jam information, counter information acquisition, and toner-out condition (notification about a remaining amount of toner) of the image forming apparatus 100.

The PC 506 obtains the above monitoring information from the control device 110 through the LAN 400. The user registers the PC 506, which is equipped with the remote monitoring system, in the control device 110 in advance. As a result, the control device 110 provides information on the PC 506 through the LAN 400.

It should be noted that the HTTPS protocol that offers HTTP communications encrypted by SSL (Secure Socket Layer) is adopted for communication between the PC 506 and the image forming apparatus 100. Also, a destination to which the image forming apparatus 100 is connected is limited to the PC 506.

Information is sent as attachments to electronic mails to the PC 506, and the electronic mails are encrypted using a public-key encryption system ensuring a high level of security and sent to the PC 506 by one-way communication. Thus, nothing other than information required for remotely monitoring the image forming apparatus 100 is sent to the PC 506, and hence the user can use the remote monitoring system with a feeling of security. This remote monitoring system can improve the efficiency of management work and deal speedily with troubles.

Figure 2:
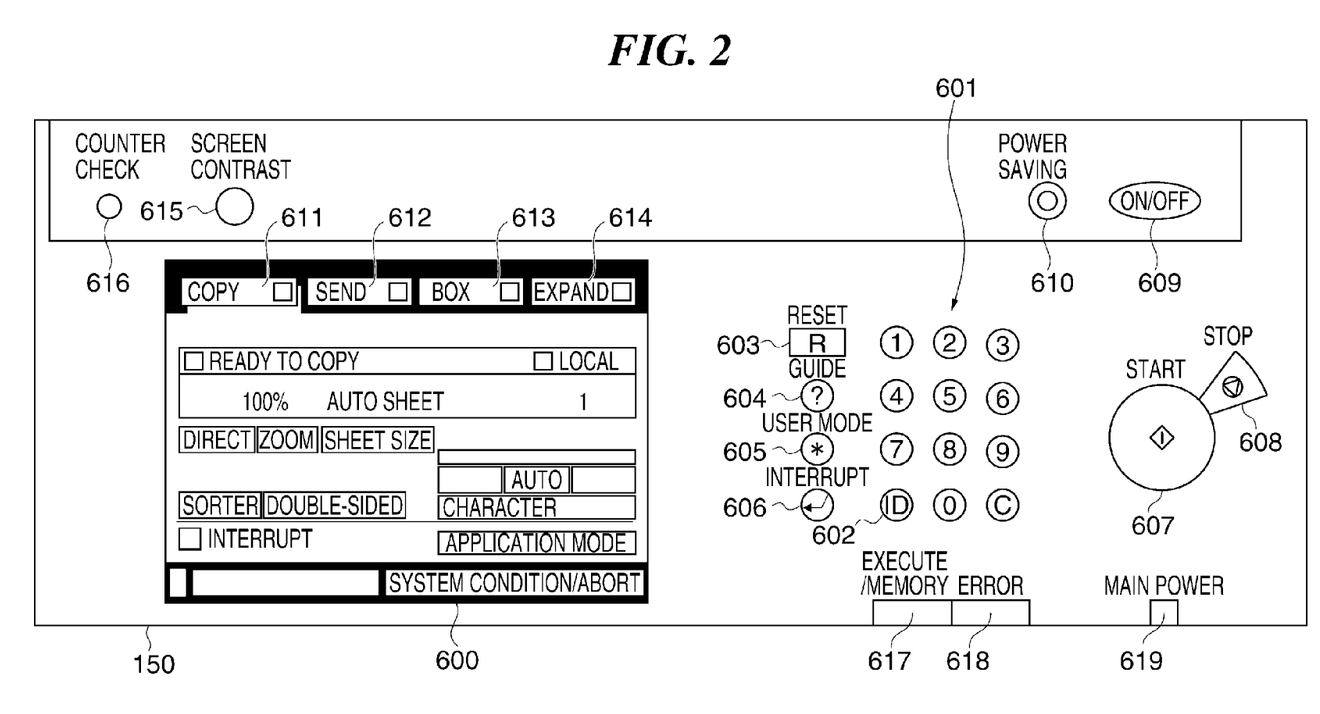
FIG. 2 is a view showing an appearance of an operation unit appearing in FIG. 1.

FIG. 2 is a view showing an appearance of the operation unit 150 appearing in FIG. 1.

Referring to FIG. 2, an LCD touch panel 600 displays information for the user of the image forming apparatus 100. A numeric keypad 601 is comprised of keys for the user to input numeric values from 0 to 9. An ID key 602 is used to input a division number and a password mode when the image forming apparatus 100 is under divisional management.

A reset key 603 is for resetting operation modes or the like. A guide key 604 is for displaying, on the LCD touch panel 600, screens that provide explanations about respective operation modes. A user mode key 605 is for displaying a user mode screen on the LCD touch panel 600. An interrupt key 606 is for performing interrupt copying.

A start key 607 is for starting a copying operation. A stop key 608 is for stopping a copying operation that is being performed.

A software power SW 609 is a key for turning off a backlight of the LCD touch panel 600 to bring the image forming apparatus 100 into a low-power state. A power-saving key 610 is for bringing the image forming apparatus 100 into a power-saving state, and when the power-saving key 610 is depressed in the power-saving state, the image forming apparatus 100 returns from the power-saving state.

Function keys 611, 612, 613, and 614 are for displaying standard screens of a copy function, a sending function, a box function, and an expanding function, respectively. In the state illustrated in FIG. 2, the standard screen of the copy function is displayed, and the standard screens of the respective functions are displayed using the other function keys 612, 613, and 614. It should be noted that the box function is a function of storing images in the HDDs 520 and 521.

An adjustment key 615 is for adjusting the contrast of the LCD touch panel 600. A counter check key 616 is for displaying a count screen, which displays the number of copies counted, on the LCD touch panel 600.

An LED 617 indicates that an image is being accumulated in image memory while a job is executed. An error LED 618 indicates that the image forming apparatus 100 is in an error state such as jam, door open, or the like. A power supply LED 618 indicates that a main switch of the image forming apparatus 100 is on.

Figure 3:
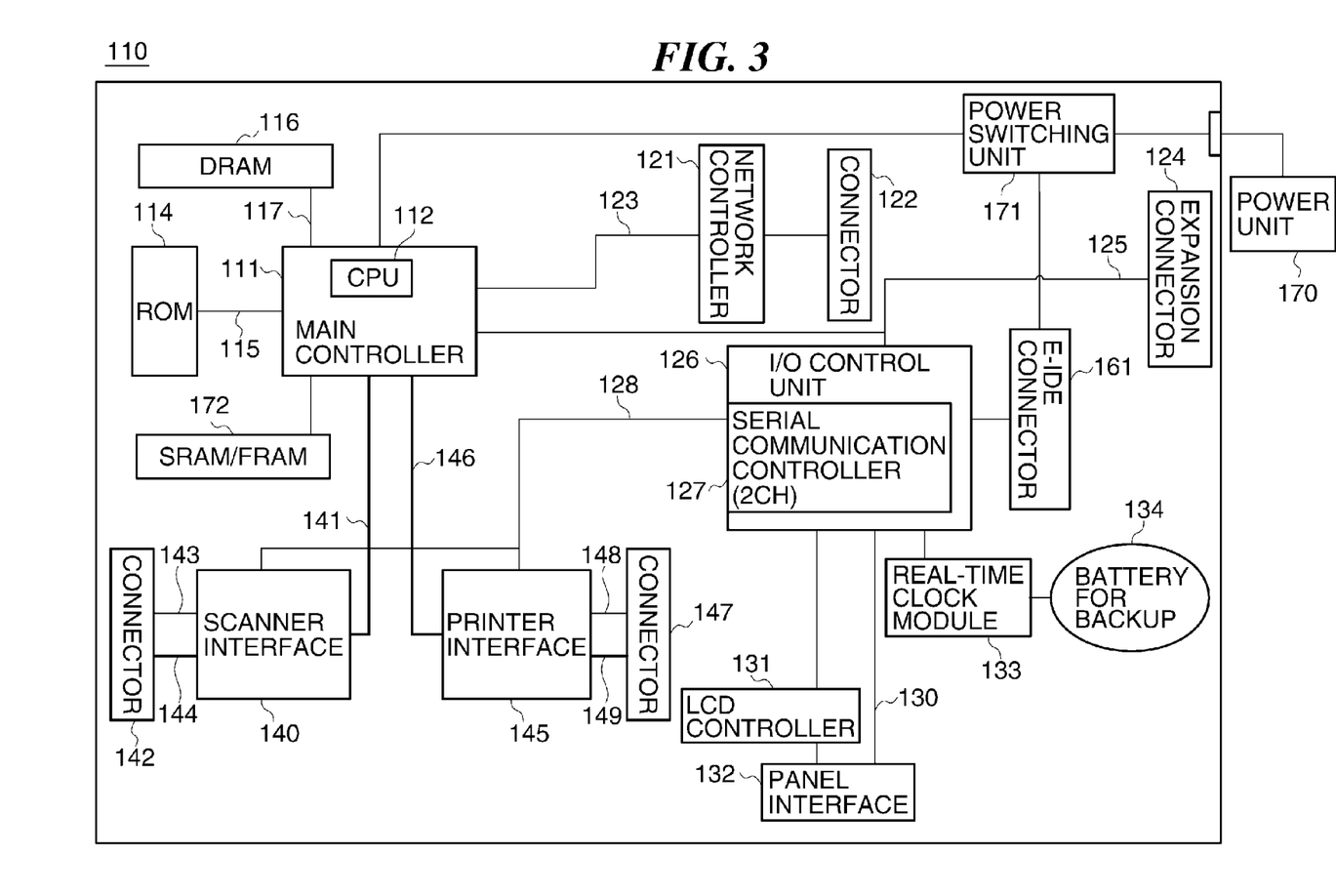
FIG. 3 is a diagram schematically showing an arrangement of a control device appearing in FIG. 1.

FIG. 3 is a diagram schematically showing an arrangement of the control device 110 appearing in FIG. 1.

Referring to FIG. 3, a main controller 111 includes a CPU 112, which controls the overall operation of the control device 110.

The CPU 112 operates based on programs read from a ROM 114 via a ROM interface 115. The programs include a program for interpreting PDL (page description language) code data received from the PC 506 and expanding the same into raster image data.

The main controller 111 also includes a bus controller as will be described later with reference to FIG. 4, and as to transfer of data input and output via each interface, the bus controller controls arbitration when bus contention occurs, and controls DMA data transfer.

A DRAM 116 is connected to the main controller 111 via a DRAM interface 117, and is used as a work area for operation of the CPU 112 and to store image data.

An SRAM/FRAM (registered trademark) 172, which is a nonvolatile storage device connected to the main controller 111, is used to store data that is not erased even when no power is fed.

A network controller 121 is connected to the main controller 111 via an interface 123, and connected to an external network such as the LAN 400 by a connector 122.

An expansion connector 124, which enables connection of an expansion board, and an I/O control unit 126 are connected to a universal high-speed bus 125. Common examples of the universal high-speed bus include a PCI bus.

The I/O control unit 126 is equipped with a two-channel asynchronous serial communication controller 127 for sending and recording control commands to and from respective CPUs of the reader unit 200 and the printer unit 300, and connected to a scanner interface 140 and a printer interface 145 via an I/O bus 128.

A panel interface 132 is comprised of an interface for producing displays on the LCD touch panel 600, and a key input interface 130 for receiving inputs from the various keys and the touch panel keys described above with reference to FIG. 2.

Signals input via the touch panel keys or the various keys of the operation unit 150 are transmitted to the CPU 112 via the panel interface 132, and the LCD touch panel 600 displays image data sent from the panel interface 132.

A real-time clock module 133 updates and stores date and time managed by the image forming apparatus 100 and is battery-protected by a backup battery 134.

An E-IDE connector 161 is for enabling connection of an external storage device such as a hard disk or a CD-ROM. The E-IDE connector 161 allows reading of programs and image data stored in the external storage device, and storage of various data.

A power supply unit 170 supplies power to the control device 110. A power supply switching unit 171 is controlled by the CPU 112 as to whether or not to feed power to each device.

Connectors 142 and 147 are connected to the reader unit 200 and the printer unit 300, respectively. In this connection, asynchronous serial interfaces 143 and 148 and video interfaces 144 and 148 are used.

A scanner interface 140 is connected to the reader unit 200 via the connector 142. The scanner interface 140 is also connected to the main controller 111 by a scanner bus 141.

The scanner interface 140 has a function of carrying out optimum binarization and zooming in main scanning and sub scanning with respect to image data output from the reader unit 200 according to processing that is subsequently performed.

Further, the scanner interface 140 also has a function of outputting a control signal, which is generated based on a video control signal output from the reader unit 200, to the scanner bus 141.

Data transfer from the scanner bus 141 to the DRAM 116 is controlled by the bus controller.

A printer interface 145 is connected to the printer unit 300 via the connector 147. The printer interface 145 is also connected to the main controller 111 by a scanner bus 146.

The printer interface 145 has a function of carrying out a smoothing process on image data output from the main controller 111 and outputting the resulting image data to the printer unit 300. The printer interface 145 also has a function of outputting a control signal, which is generated based on a video control signal output from the printer unit 300, to the printer bus 146.

Transfer of raster image data decompressed by the DRAM 116 to the printer unit 300 is controlled by the bus controller. The raster image data is DMA-transferred to the printer unit 300 via the printer bus 146 and a video interface 149.

Figure 4:
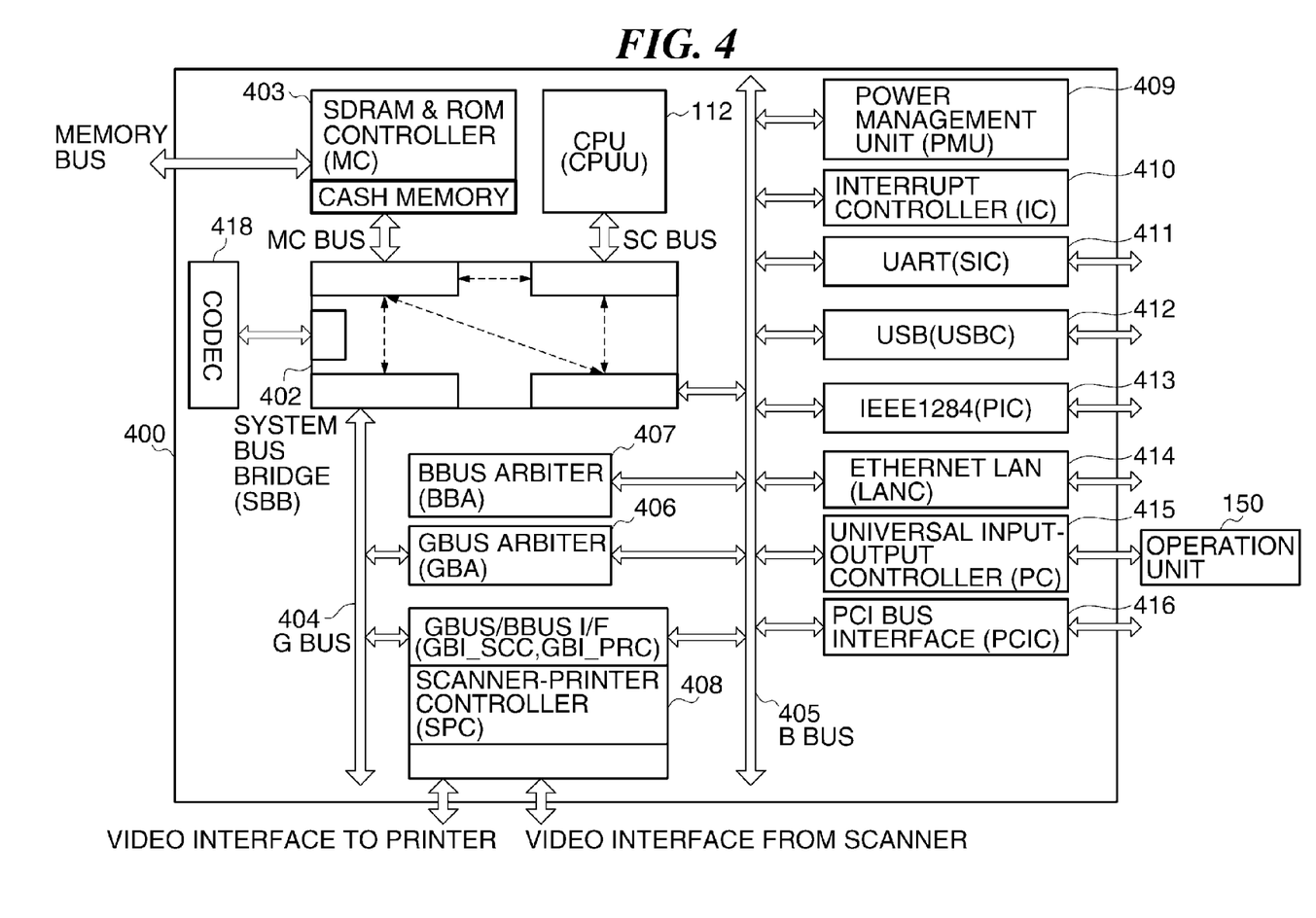
FIG. 4 is a diagram schematically showing an arrangement of a main controller appearing in FIG. 2.

FIG. 4 is a diagram schematically showing an arrangement of the main controller 111 appearing in FIG. 2.

Referring to FIG. 4, the CPU 112 is connected to a system bus bridge (SBB) 402 via an SC bus which is a 64-bit processor bus.

The SBB 402 is a 4 by 4 64-bit crossbar switch and connected to a memory controller 403, which controls SDRAM and ROM with cash memory, by an MC bus, which is a dedicated local bus, in addition to the CPU 112.

Further, the SBB 402 is connected to a G bus 404, which is a graphic bus, and a B bus 405, which is an I/O bus, and thus connected to four buses in total. The SBB 402 is designed to ensure simultaneous parallel connections between these four modules to the extent possible.

Moreover, the SBB 402 is connected to a data compression-decompression unit (codec) 418 via a codec interface.

The G bus 404 is cooperatively controlled by a G bus arbiter (GBA) 406 and connected to a scanner/printer controller (SPC) 408 so as to connect with the reader unit 200 and the printer unit 300.

The B bus 405 is cooperatively controlled by a B bus arbiter (BBA) 407 and connected to a power management unit (PMU) 409, an interrupt controller (IC) 410, a serial interface controller (SIC) 411 using UART, a USB controller (USBC) 412, a parallel interface controller (PIC) 413 using IEEE 1284, a LAN controller (LANC) 414 for the use of the Ethernet (registered trademark), a universal input-output controller (PC) 414 connected to the operation unit 150, and a PCI bus interface (PCIC) 416, as well as the SPC 408.

The interrupt controller 410 is connected to the B bus 405 and accumulates interrupts from functional blocks in a main controller chip and from outside the chip. The interrupt controller 410 then redistributes the accumulated interrupts as 6-level external interrupts and non-maskable interrupts (NMIs) supported by the CPU 112.

It should be noted that the functional blocks mentioned above include the PMU 409, the SIC 411, the USBC 412, the PIC 413, the LANC 414, the universal input-output controller 414, the PCIC 416, the SPC 408, and so on.

The memory controller 403 is connected to an MC bus, which is a local bus exclusive, to the memory controller 403, and controls SDRAM, flash ROM, and ROM.

As described above, the main controller 111 is a large-scale ASIC (application-specific integrated circuit) having the CPU 112 incorporated therein. For this reason, when all the internal logics operate at the same time, a large amount of heat is generated, which may cause the chip itself to be broken.

To prevent this, the main controller 111 carries out management of power in each block, that is, power management, and also monitors the amount of power consumed by the entire chip. The blocks individually carry out power management.

Information on the amounts of power consumed by the respective blocks is collected as power management levels in the PMU 409. The PMU 409 sums the amounts of power consumed by the respective blocks, and collectively monitors the amounts of power consumed by the respective blocks such that that the sum can be no greater than a power consumption limit.

Moreover, the LANC 414 and the universal input-output controller 415, which connected to the operation unit 150, correspond to a notification unit that notifies electronic equipment predetermined in advance of information on the HDDs 520 and 521. In the case of the present embodiment, the electronic equipment is the PC 506 or the LCD touch panel 600.

Figure 5:
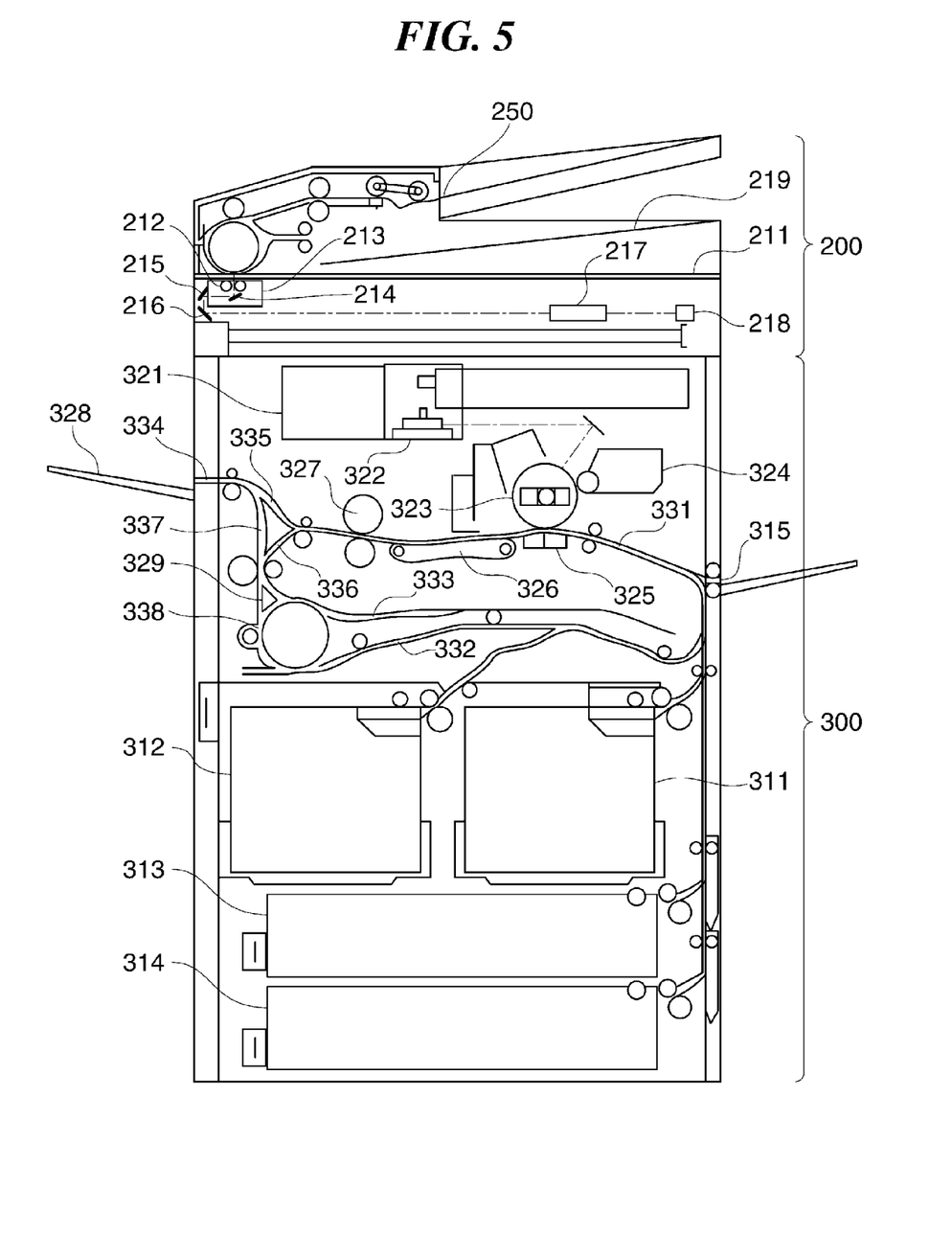
FIG. 5 is a cross-sectional view showing a reader unit and a printer unit of the image forming apparatus appearing in FIG. 1.

FIG. 5 is a cross-sectional view showing the reader unit 200 and the printer unit 300 of the image forming apparatus 100 appearing in FIG. 1.

Referring to FIG. 5, the original feeding unit 250 of the reader unit 200 feeds originals one by one in order from the first one onto a platen glass 211, and when reading of the originals is completed, discharges the originals on the platen glass 211 onto a discharge tray 219.

When an original is conveyed to the platen glass 211, the reader unit 200 turns on a lamp 212 and starts moving an optical unit 213 to scan the original by exposing it to light. Light reflected from the original at this time is guided to a CCD image sensor (CCD) 218 by mirrors 214, 215, 216 and a lens 217.

Thus, the scanned original image is read by the CCD 218. Image data output from the CCD 218 is subjected to predetermined processing and then transferred to the control device 110.

A laser driver 321 of the printer unit 300 drives a laser light-emitting unit 322 and causes the laser light-emitting unit 322 to emit laser light corresponding to image data output from the control device 110.

The laser light irradiates a photosensitive drum 323, and a latent image is formed corresponding to the laser light is formed on the photosensitive drum 323. A developer is attached to an area of the photosensitive drum 323 where the latent image is formed.

The printer unit 300 feeds a recording sheet from any of cassettes 311, 312, 313, and 314 and a manual sheet feeding cassette 315 with timing being in synchronization with starting of laser light irradiation, and guides the recording sheet to a conveying path 331, so that the developer attached to the photosensitive drum 323 is transferred to the recording sheet.

The recording sheet to which the developer has been transferred is conveyed to a fixing unit 327 by a conveying belt 326, and the developer is fixed to the recording sheet by heat and pressure of the fixing unit 327.

Thereafter, the recording sheet having passed the fixing unit 327 passes through conveying paths 335 and 334 and is discharged onto a sheet discharge bin 328. It should be noted that when the recording sheet is to be discharged onto the sheet discharge bin 328 with a surface of the recording sheet to which the developer has been transferred face down, the recording sheet is guided to conveying paths 336 and 338 and then conveyed in an opposite direction to pass through conveying paths 337 and 324.

In the case of double-sided printing, after passing the fixing unit 327, the recording sheet is guided from the conveying path 336 to a conveying path 333 by a flapper 329 and then conveyed in an opposite direction. Then, the recording sheet is guided to the conveying path 338 and a sheet refeeding conveying path 332 by the flapper 329. The recording sheet guided to the sheet refeeding conveying path 332 passes through the conveying path 331 with the above described timing and fed to a transfer unit 325.

A description will now be given of a self-diagnostic function using S.M.A.R.T. (Self-Monitoring, Analysis and Reporting Technology) information (hereafter referred to as "SMART information").

The SMART information is information which an HDD stores by itself for the purpose of early detecting and predicting a failure of the HDD, and corresponds to status information indicative of a status of the HDD.

The SMART information is information that is indicative of statuses obtained by self-diagnosing various check items in real time and is represented as numeric values. All failures cannot be predicted using the SMART information, but the SMART information is very useful for detecting failures caused by age deterioration in a stable use environment.

At present, SMART information can be obtained from almost all HDDs. For example, areas in which SMART information is stored are reserved in the HDDs 520 and 521, and the HDDs 520 and 521 constantly store SMART information on themselves. Thus, the HDDs 520 and 521 have the self-diagnostic function.

A description will now be given of exemplary SMART information.

Item ID 0x1 (=1): item name Raw Read Error Rate represents the percentage of errors occurring when data is read from a hard disk. When the numeric value is smaller than a threshold value, something is wrong with a magnetic disk or a magnetic head in the hard disk.

Item ID 0x5 (=5): item name Reallocated Sectors Count represents count of bad sectors that have been subjected to reallocation (movement of data to a reserve area that is specially reserved).

Item ID 0xC4 (=196): item name Reallocation Event Count represents count of sector reallocation events that have occurred. Even if a reallocation event ends in failure, it is added to reallocation event count.

Item ID 0xC5 (=196): item name Current Pending Sector Count represents count of sectors currently having abnormalities and pending reallocation. This value decreases if any sector is successfully read later.

Item ID 0xC6 (=198): item name Off-Line Scan Uncorrectable Sector Count represents count of uncorrectable sectors detected during online scanning. When this value increases, there is an obvious problem with a surface of a magnetic disk.

Item ID 0xDC (=220): item name Disk Shift represents the distance by which a disk (platter) is shifted from its original fixing position on impact or the like.

Thus, examples of SMART information includes read error rate, bad sector count, reallocated event count, abnormal sector count, uncorrectable sector count, and platter shift distance. Threshold values for the respective items are set to, for example, the following values.

The read error rate "Raw Read Error Rate" assumes values from 0 to 100; 100 indicates no error, and 0 indicates that all are errors, and when the value becomes equal to or smaller than 6, it is determined that notification of a failure prediction is necessary.

The bad sector count "Reallocated Sectors Count" assumes values equal to or greater than 0, and when the value becomes equal to or greater than 100, it is determined that notification of a failure prediction is necessary.

The sector reallocation event count "Reallocation Event Count" assumes values equal to or greater than 0, and when the value becomes equal to or greater than 50, it is determined that notification of a failure prediction is necessary.

The abnormal sector count "Current Pending Sector Count" assumes values equal to or greater than 0, and when the value becomes equal to or greater than 50, it is determined that notification of a failure prediction is necessary. When the abnormal sector count becomes greater than a predetermined threshold value, an HDD tends to be broken in a stroke due to abnormal sectors increasing in an exponential manner. The threshold value is determined with consideration given to this.

The uncorrectable sector count "Off-Line Scan Uncorrectable Sector Count" assumes values equal to or greater than 0, and when the value becomes equal to or greater than 50, it is determined that notification of a failure prediction is necessary.

The platter shift distance "Disk Shift" assumes values equal to or greater than 0, and when the value becomes equal to or greater than 50, it is determined that notification of a failure prediction is necessary.

The control device 110 sends a SATA command to the HDDs 520 and 521 via the mirroring unit 525, and when detecting a response indicative of an HDD abnormality, determines that an HDD failure has occurred.

Examples of the HDD abnormality include data abnormality (Uncorrectable Data Error), sector abnormality (Bad Sector), SATA communication error when reading, SATA communication error when writing, device status error (Not Ready, Write Fault, or the like), device formatting uncompleted, hard disk controller error, buffer diagnosis error, memory diagnosis error, system area read error, and calibration abnormality (a track 0 cannot be found during calibration).

Even in such a state, a retry may be performed without determining that an HDD failure has occurred, and when the retry is unsuccessful, it may be determined that an HDD failure has occurred. For example, when a first read from a certain sector ends in failure, and further, five reads from the sector at intervals of several hundred milliseconds with a response time limit extended end in failure, it is determined that an HDD failure has occurred.

The reason why the response time limit is extended, and some time is spared before the next read and write is that an HDD may vibrate due to a printing operation or the like during reading of the HDD, causing delays in read-write response of the HDD.

Thus, for numeric values represented by respective pieces of SMART information, respective threshold values for predicting failures are determined. By comparing the threshold values and the SMART information with each other, it is determined whether or not to provide notification of a failure prediction.

Figure 6:
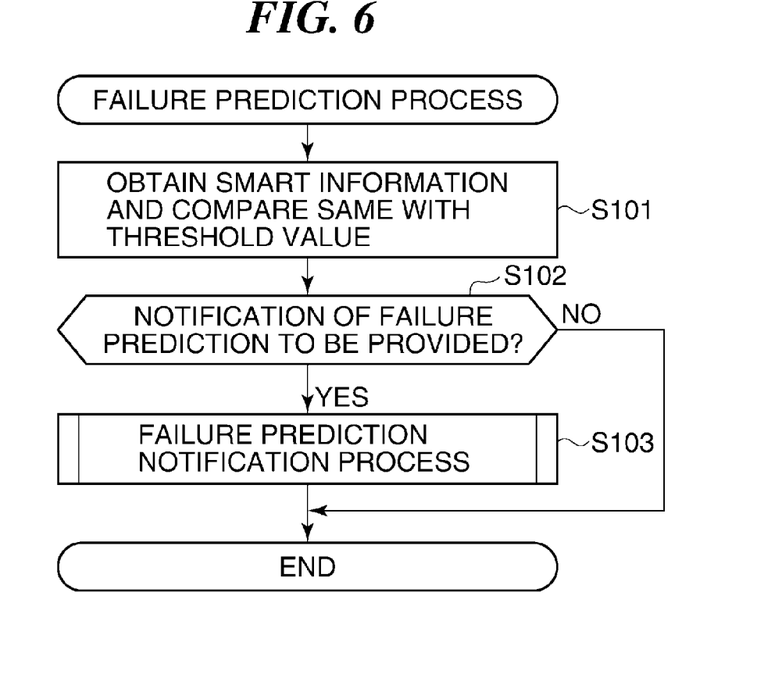
FIG. 6 is a flowchart showing the procedure of a failure prediction process carried out by a CPU appearing in FIG. 3.

FIG. 6 is a flowchart showing the procedure of a failure prediction process carried out by the CPU 112 appearing in FIG. 3.

Referring to FIG. 6, the CPU 112 obtains smart information stored in the HDDs 520 and 521 by way of the I/O control unit 126, the E-IDE connector 161, and the mirroring unit 525. The CPU 112 then stores the obtained smart information in the DRAM 116, and by comparing pieces of the smart information with the respective threshold values, predicts whether or not the HDDs 520 and 521 will fail (step S101).

Then, as a result of comparison with the threshold values, the CPU 112 determines whether or not to provide notification of a failure prediction (step S102). The step S101 corresponds to an obtainment unit that obtains status information indicative of statuses of the HDDs 520 and 521 obtained using the self diagnosis function which the HDDs 520 and 521 has, and a prediction unit that predicts whether or not the HDDs 520 and 521 will fail based on the obtained status information.

When, as a result of the determination in the step S102, determining not to provide notification of a failure prediction (NO in the step S102), the CPU 112 terminates the present process.

On the other hand, when, as a result of the determination in the step S102, determining to provide notification of a failure prediction (YES in the step S102), the CPU 112 carries out a failure prediction notification process in which it determines whether or not to actually provide notification of a failure prediction (step S103) and terminates the present process.

There are four examples of the failure prediction notification process, and a description will now be given of them. It should be noted that in the following description, an object which is to be notified of a failure prediction is one of the PC 506 and the LCD touch panel 600, but notification may be provided to not only one object clearly specified in the process but also the other object. Also, in the following description, error and alarm are used, and error means that replacement of the HDDs 520 and 521 is necessary, and alarm means that a failure of the HDDs 520 and 521 has been predicted.

Figure 7:
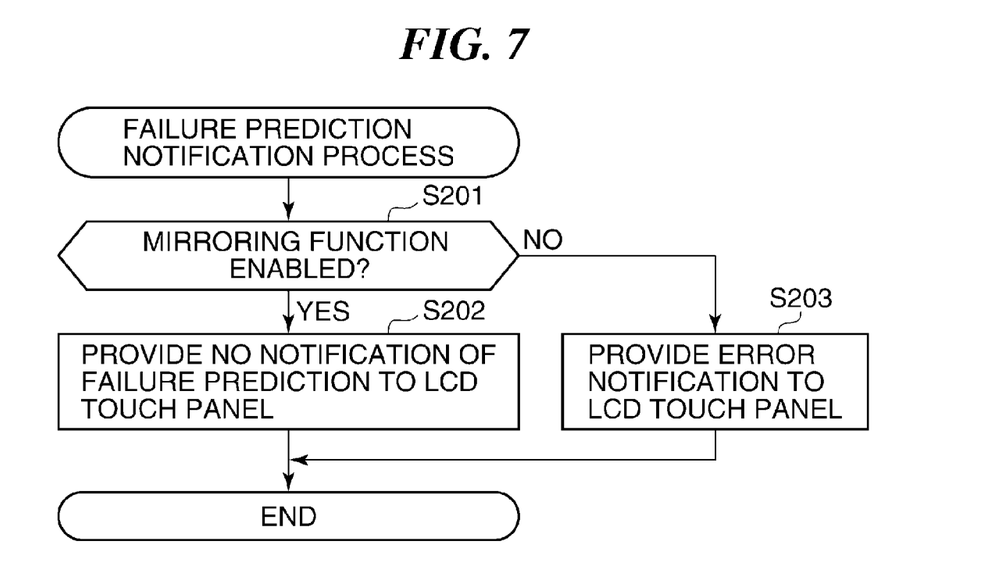
FIG. 7 is a flowchart showing the procedure of a failure prediction notification process (first) in step S103 appearing in FIG. 6.

FIG. 7 is a flowchart showing the procedure of the failure prediction notification process (first) in the step S103 appearing in FIG. 6.

Referring to FIG. 7, the CPU 112 determines whether or not the mirroring function is enabled (step S201). When, as a result of the determination in the step S201, the mirroring function is not enabled (NO in the step S201), the CPU 112 displays, on the LCD touch panel 600, a screen showing an error notification indicative of the need to replace the HDDs 520 and 521 as a failure prediction notification (step S203) and terminates the present process.

On the other hand, when as a result of the determination in the step S201, the mirroring function is enabled (YES in the step S201), the CPU 112 does not notify the LCD touch panel 600 of a failure prediction (step S202) and terminates the present process.

It should be noted that the process in FIG. 7 may also be carried out when activation of the image forming apparatus 100, reconfiguration of the mirroring function, reconfiguration of the failure predicting function, and so on are performed.

Thus, in the failure prediction notification process (first), when the mirroring function and the failure predicting function are enabled, notification of a failure prediction based on smart information is not provided.

The step S103 corresponds to a control unit. Specifically, when a failure of the HDDs 520 and 521 is predicted (YES in the step S102), and the mirroring function is disabled (NO in the step S201), the CPU 112 controls the universal input-output controller 415 so as to notify the LCD touch panel 600 that replacement of the HDDs 520 and 521 is necessary.

On the other hand, when a failure of the HDDs 520 and 521 is predicted (YES in the step S102), and the mirroring function is enabled (YES in the step S201), the CPU 112 controls the universal input-output controller 415 so as not to notify the LCD touch panel 600 that replacement of the HDDs 520 and 521 is necessary.

According to the process in FIG. 7, because unnecessary notification of an HDD failure prediction is not provided, the effect of eliminating undesired downtime of the image forming apparatus 100 and reducing operational costs required for HDDs, replacement thereof, and so on can be obtained.

Figure 8:
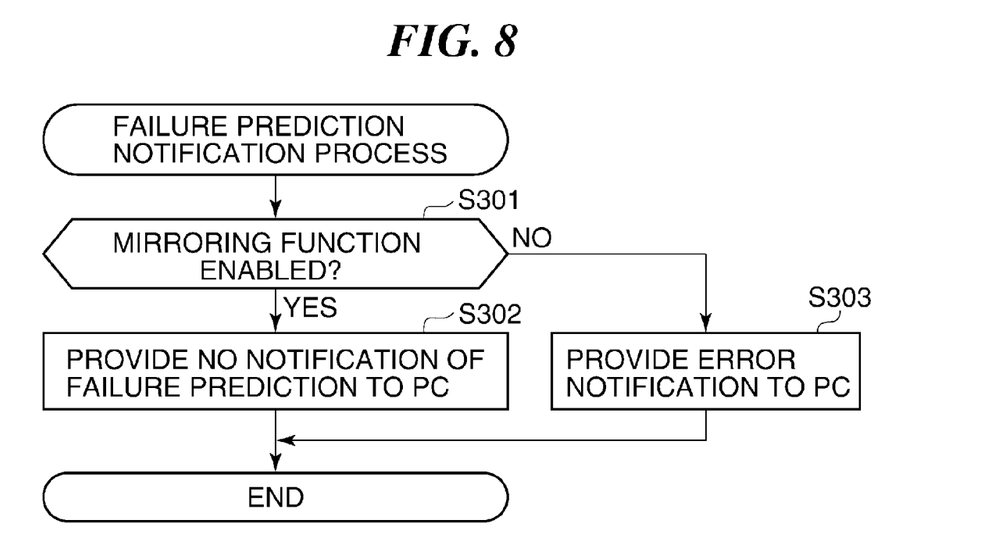
FIG. 8 is a flowchart showing the procedure of the failure prediction notification process (second) in the step S103 appearing in FIG. 6.

FIG. 8 is a flowchart showing the procedure of the failure prediction notification process (second) in the step S103 appearing in FIG. 6.

Referring to FIG. 8, the CPU 112 determines whether or not the mirroring function is enabled (step S301). When, as a result of the determination in the step S301, the mirroring function is not enabled (NO in the step S301), the CPU 112 provides notification of an error as a failure prediction notification to the PC 506 (step S303) and terminates the present process.

On the other hand, when, as a result of the determination in the step S301, the mirroring function is enabled (YES in the step S301), the CPU 112 does not provide notification of a failure prediction (step S302) and terminates the present process.

Thus, in the failure prediction notification process (second), when the mirroring function and the failure predicting function are enabled, notification of a failure prediction based on smart information is not provided to the PC 506.

According to the process in FIG. 8, the effect of preventing notification of an unnecessary failure prediction to a service engineer can be obtained.

Figure 9:
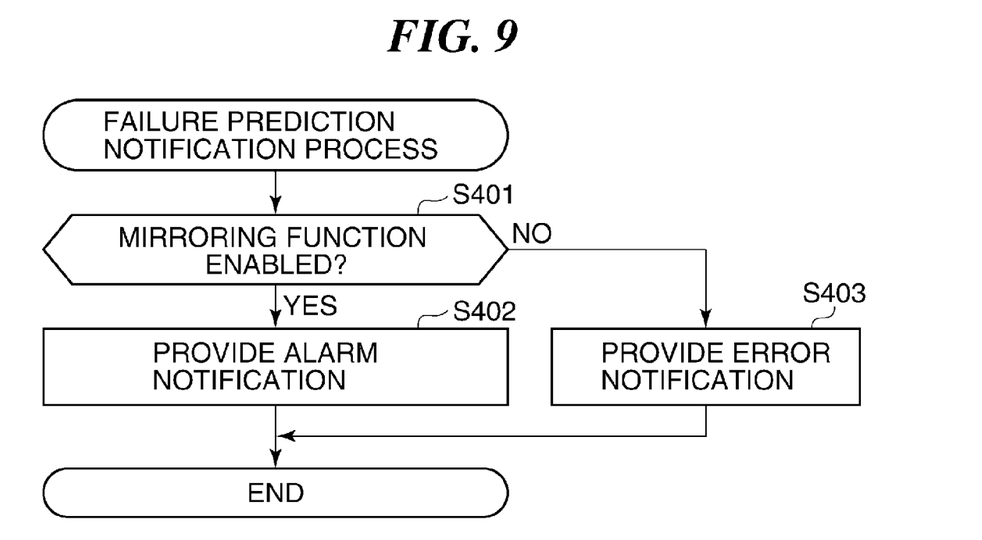
FIG. 9 is a flowchart showing the procedure of the failure prediction notification process (third) in the step S103 appearing in FIG. 6.

FIG. 9 is a flowchart showing the procedure of the failure prediction notification process (third) in the step S103 appearing in FIG. 6.

Referring to FIG. 9, the CPU 112 determines whether or not the mirroring function is enabled (step S401). When, as a result of the determination in the step S401, the mirroring function is not enabled (NO in the step S401), the CPU 112 provides notification of an error as a failure prediction notification to the PC 506 (step S403) and terminates the present process.

On the other hand, when, as a result of the determination in the step S401, the mirroring function is enabled (YES in the step S401), the CPU 112 gives an alert as a failure prediction notification to the PC 506 (step S402) and terminates the present process.

Thus, in the failure prediction notification process (third), when the mirroring function and the failure predicting function are enabled, notification of an alert is provided as a failure prediction notification to the PC 506.

On the other hand, when the mirroring function is disabled and the failure predicting function is enabled, notification of an error is provided as a failure prediction notification to the PC 506.

Therefore, in the failure prediction notification process (third), notification of an alert which does not call a service engineer and notification of an error which calls a service engineer are selectively provided. Thus, when a failure of the HDDs 520 and 521 is predicted and the mirroring function is enabled, notification that a failure of the HDDs 520 and 521 is predicted is provided.

Figure 10:
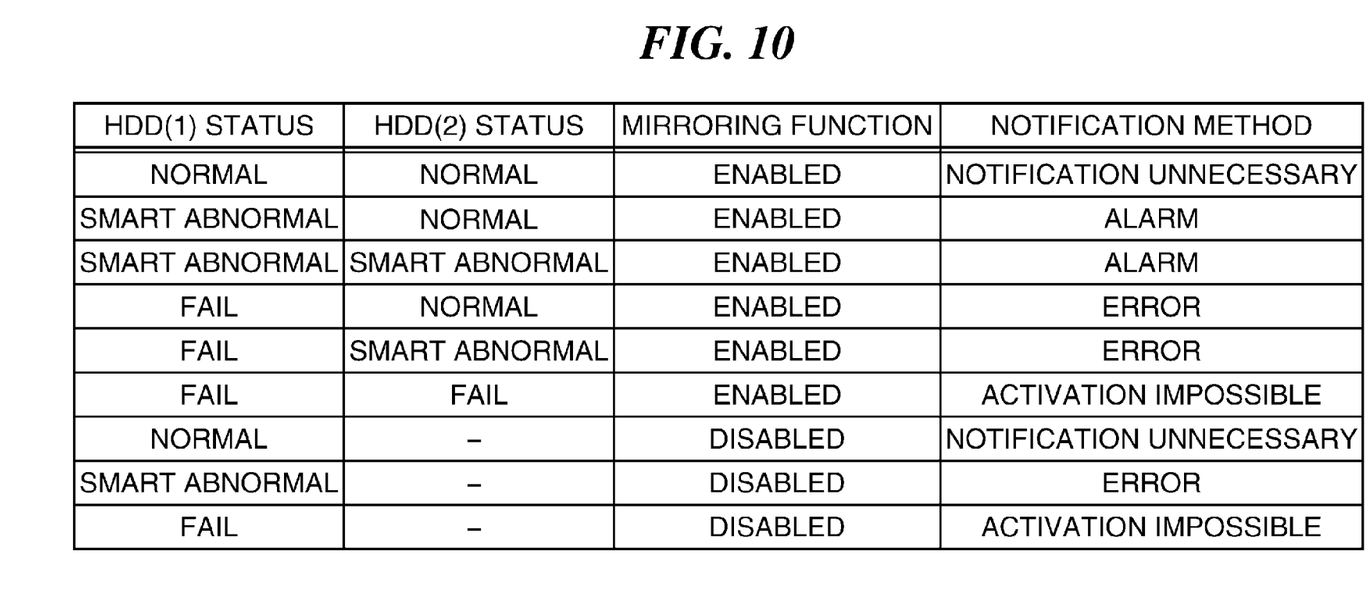
FIG. 10 is a view showing criteria on which to use an alarm and an error.

FIG. 10 is a view showing criteria on which to use an alarm and an error.

Referring to FIG. 10, HDD(1) status indicates a status of the HDD 520, and HDD(2) status indicates a status of the HDD 521. SMART abnormal indicates a state in which it is necessary to provide notification of a failure prediction based on SMART information.

Also, mirroring function indicates whether or not the mirroring function is enabled. Notification method indicates details of notification to the PC 506 or details displayed on the LCD touch panel 600. Alarm and error represent that notification of an alarm and notification of an error are provided or displayed. "Notification unnecessary" indicates that notification or display is not to be provided, and "activation impossible" indicates that the image forming apparatus 100 itself cannot be activated.

For example, when HDD(1) status is SMART abnormal, HDD(2) status is normal, and mirroring is enabled, notification of an alarm is displayed on the LCD touch panel 600 and provided to the PC 506.

According to the process in FIG. 9, because notification of a failure prediction can be provided to a service engineer in an appropriate manner according to a status of the image forming apparatus 100, the effect of preventing an unnecessary visit of the service engineer while providing notification of an HDD failure prediction to the user and the service engineer can be obtained.

Figure 11:
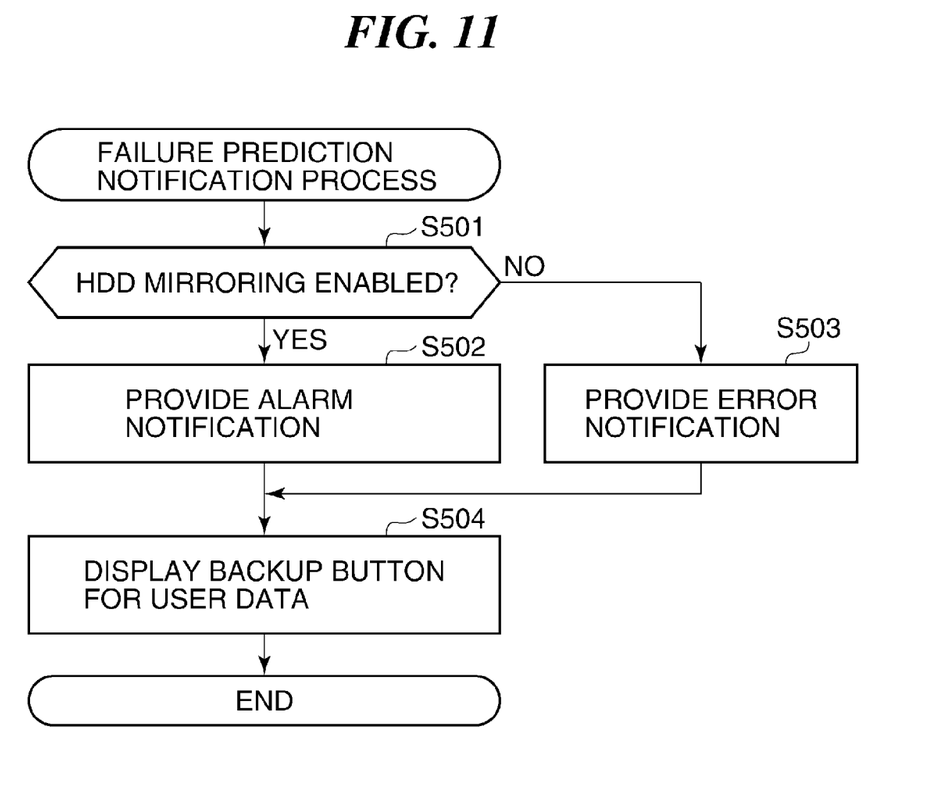
FIG. 11 is a flowchart showing the procedure of the failure prediction notification process (fourth) in the step S103 appearing in FIG. 6.

FIG. 11 is a flowchart showing the procedure of the failure prediction notification process (fourth) in the step S103 appearing in FIG. 6.

Referring to FIG. 11, the CPU 112 determines whether or not the mirroring function is enabled (step S501). When, as a result of the determination in the step S501, the mirroring function is not enabled (NO in the step S501), the CPU 112 provides notification of an error as a failure prediction notification to the PC 506 (step S503) and terminates the present process.

On the other hand, when, as a result of the determination in the step S501, the mirroring function is enabled (YES in the step S501), the CPU 112 provides notification of an alert as a failure prediction notification to the PC 506 (step S502).

Then, the CPU 112 displays a backup button for user data on the LCD touch panel 600 (step S504) and terminates the present process.

The user data can be backed up by the user depressing the backup button. The user data includes saved document data, address list data, transfer setting data, timer setting data, system management setting data, PDL setting data, sheet information setting data, and so on.

Figure 12:
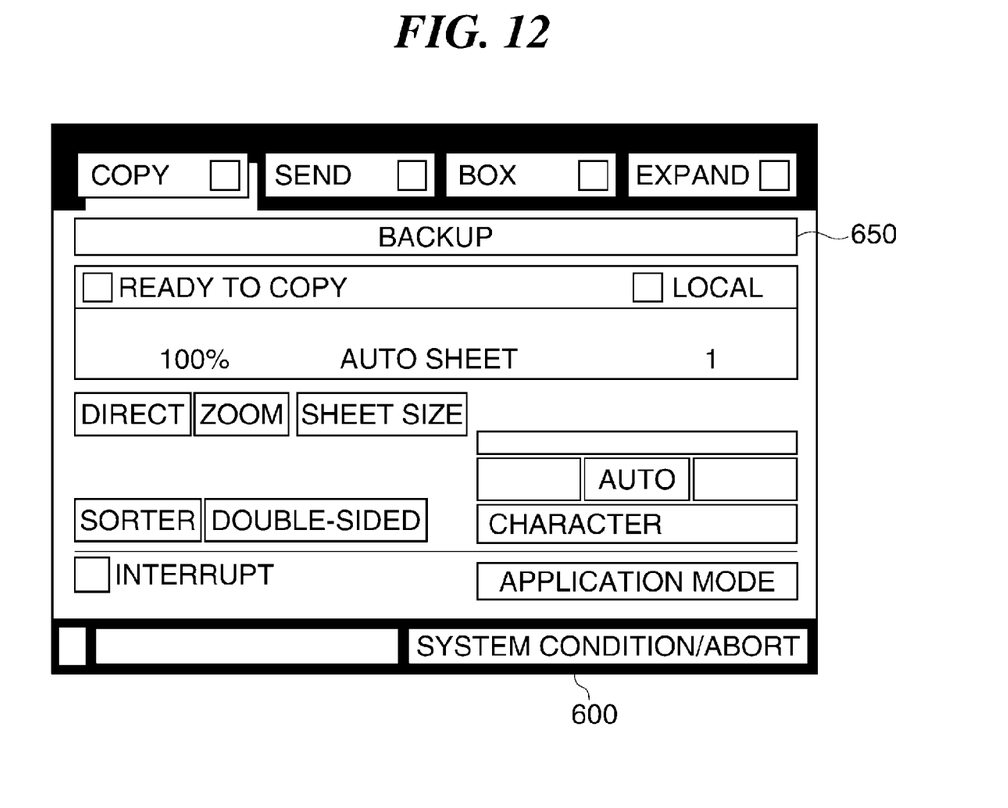
FIG. 12 is a view showing a backup button displayed on an LCD touch panel appearing in FIG. 2.

FIG. 12 is a view showing the backup button displayed on the LCD touch panel 600 appearing in FIG. 2.

Referring to FIG. 12, the backup button 650 is displayed on the LCD touch panel 600.

In this case, the user inserts a nonvolatile device such as a USB memory or an HDD drive into the expansion connector 124 (see FIG. 3) of the image forming apparatus 100 and depresses the backup button 650.

Notification that the depression of the backup button 650 by the user is provided to the CPU 112 by a route passing through the panel interface 132, the LCD controller 131, the I/O control unit 126, the main controller 111, the SIC 411, and the SBB 402 in this order.

The user data is stored in the DRAM 116 by a route passing through the HDDs 520, 521, the mirroring unit 525, the E-IDE connector 161, the I/O control unit 126, and the main controller 111.

Thereafter, the user data stored in the DRAM 116, in turn, is stored in the USB memory, which is connected to the expansion connector 124, by a route passing through the main controller 111, the USBC 412, the I/O control unit 126, and the expansion connector 124.

According to the process in FIG. 11, the effect of urging the user who is very conscious of user data protection to back up user data in case the two HDDs fail at the same time can be obtained.

Thus, when a failure of the HDDs 520 and 521 is predicted and the mirroring function is enabled, a button for backing up information stored in the HDDs 520 and 521 to an external storage device is displayed on the LCD touch panel 600, and when the user depresses this button, the information can be backed up to the external storage device.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a storage medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130665 filed Jun. 8, 2012, which is hereby incorporated by reference herein in its entirety.

What is claimed is:

1. An information processing apparatus comprising:
   storage units configured to have a mirroring function and a self-diagnosis function;
   a notification unit configured to notify an electronic device, which is determined in advance, of information on said storage units;
   an obtainment unit configured to obtain status information indicative of statuses of said storage units obtained by the self-diagnosis function which said storage units have;
   a prediction unit configured to, based on the status information obtained by said obtainment unit, predict whether said storage units will fail; and
   a control unit configured to control said notification unit such that, when said prediction unit predicts a failure of said storage units, and the mirroring function is disabled, the electronic device is notified that replacement of said storage units is necessary, and control said notification unit such that, when said prediction unit predicts a failure of said storage units, and the mirroring function is enabled, the electronic device is not notified that replacement of said storage units is necessary.

2. An information processing apparatus according to claim 1, wherein said control unit controls said notification unit to, when a failure of said storage units is predicted by said prediction unit, and the mirroring function is enabled, notify the electronic device that a failure of said storage units is predicted by said prediction unit.

3. An information processing apparatus according to claim 1, wherein the electronic device comprises a monitoring device for use in monitoring the information processing apparatus, or a display device that displays information for a user in the information processing apparatus.

4. An information processing apparatus according to claim 3, wherein, when a failure of said storage units is predicted by said prediction unit, and the mirroring function is enabled, a button for backing up information stored in said storage units to an external storage device is displayed on the display device, and when the button is depressed by the user, the information is backed up to the external storage device.

5. A control method for an information processing apparatus having storage units that have a mirroring function and a self-diagnosis function, and a notification unit that notifies an electronic device, which is determined in advance, of information on the storage units, comprising:
  an obtainment step of obtaining status information indicative of statuses of the storage units obtained by the self-diagnosis function which the storage units have;
  a prediction step of, based on the status information obtained in said obtainment step, predicting whether the storage units will fail; and
  a control step of controlling the notification unit such that, when a failure of the storage units is predicted in said prediction step, and the mirroring function is disabled, the electronic device is notified that replacement of the storage units is necessary, and controlling the notification unit such that, when a failure of the storage units is predicted in said prediction step, and the mirroring function is enabled, the electronic device is not notified that replacement of the storage units is necessary.

6. A non-transitory computer-readable storage medium storing a program for causing a computer to implement control instructions for an information processing apparatus having storage units that have a mirroring function and a self-diagnosis function, and a notification unit that notifies an electronic device, which is determined in advance, of information on the storage units, the control instructions comprising:
  obtainment instructions configured to obtain status information indicative of statuses of the storage units obtained by the self-diagnosis function which the storage units have;
  prediction instructions configured to, based on the status information obtained according to the obtainment instructions, predict whether the storage units will fail; and
  control instructions configured to control the notification unit such that, when a failure of the storage units is predicted according to the prediction instructions, and the mirroring function is disabled, the electronic device is notified that replacement of the storage units is necessary, and to control the notification unit such that, when a failure of the storage units is predicted according to the prediction instructions, and the mirroring function is enabled, the electronic device is not notified that replacement of the storage units is necessary.

* * * * *